United States Patent [19]

Roca

[11] Patent Number: 5,144,856
[45] Date of Patent: Sep. 8, 1992

[54] ADJUSTABLE CABLE SHEATH TERMINAL

[75] Inventor: Agustin Roca, Barcelona, Spain

[73] Assignee: Pujol Y Tarrago, S.A., Barcelona, Spain

[21] Appl. No.: 624,357

[22] Filed: Dec. 5, 1990

[30] Foreign Application Priority Data

Dec. 5, 1989 [ES] Spain .................... P8904147

[51] Int. Cl.⁵ ................................ F16C 1/10
[52] U.S. Cl. ..................... 74/501.5 R; 74/502.4
[58] Field of Search ............ 74/501.5 R, 502.4, 502.6; 192/111 A

[56] References Cited

U.S. PATENT DOCUMENTS

| | | | |
|---|---|---|---|
| 4,261,221 | 4/1981 | Kobayashi | 74/502.4 |
| 4,304,322 | 12/1981 | Beccaris | 74/501.5 R X |
| 4,693,137 | 9/1987 | Deligny | 74/501.5 R |
| 4,694,706 | 9/1987 | Lichtenberg et al. | 74/502.4 X |
| 4,751,851 | 6/1988 | Deligny et al. | 74/501.5 R |
| 4,798,100 | 1/1989 | Baumgarten | 74/502.4 X |
| 4,833,937 | 5/1989 | Nagano | 74/501.5 R |
| 4,854,185 | 8/1989 | Lichtenberg et al. | 74/502.4 X |
| 4,869,123 | 9/1989 | Stocker | 74/501.5 R |
| 4,955,252 | 9/1990 | Clissett et al. | 74/501.5 R |
| 5,014,569 | 5/1991 | Kelley | 74/502.4 |

Primary Examiner—Rodney H. Bonck
Assistant Examiner—Ryan Massey
Attorney, Agent, or Firm—Michael J. Striker

[57] ABSTRACT

The adjustable cable sheath terminal for a sheathed cable includes a securable cylindrical hollow main body (CP) having a plurality of radial throughgoing openings (5) and an axial throughgoing opening (8) for a sheathless cable portion; an adjusting rod (RE) slidable over a distance in the hollow body (CP) and having an external screw thread (1), the adjusting rod (RE) being fixed at one end to a sheath of the sheathed cable and being slidable with the sheath; a plurality of retaining fingers (GR) with resilient projections for spring-biasing radially outwardly held in the radial throughgoing openings (5), each retaining finger having an internal thread for engagement with the external screw thread (1) of the adjusting rod (RE) so that, when the retaining fingers are engaged with the adjusting rod (RE), the adjusting rod cannot rotate relative to the retaining fingers and is held fixed; and a lock nut (TA) rotatable around the hollow main body (CP) and the radial throughgoing openings (5) containing the retaining fingers (GR) and having interior longitudinal tightening projections for engagement with the retaining fingers (GR) to engage the internal threads of the retaining fingers (GR) with the external screw thread (1) in at least one rotational position of the lock nut. Projections are provided on the interior of the lock nut engagable in recesses of the hollow body for holding the lock nut in position.

17 Claims, 3 Drawing Sheets

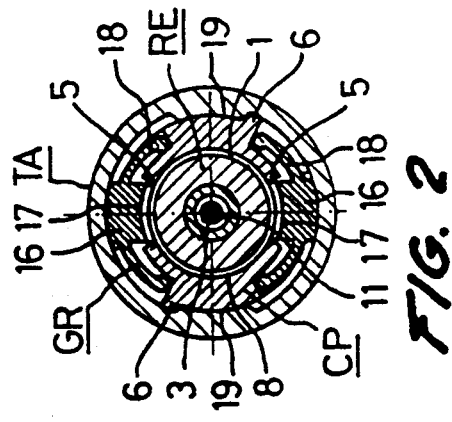
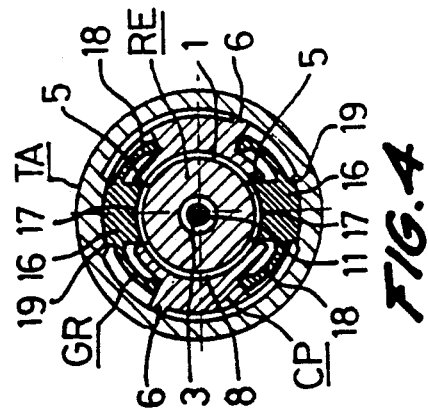
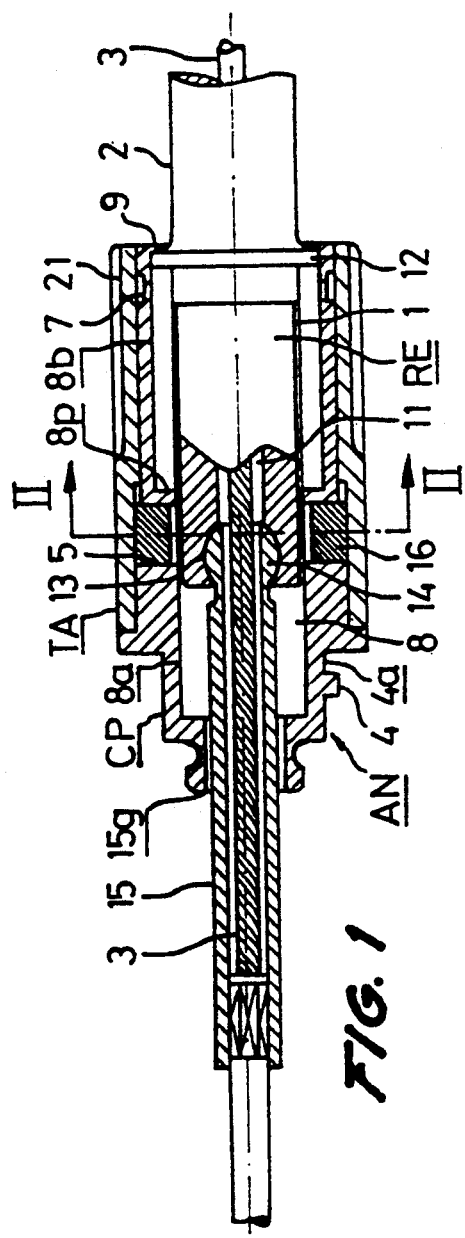
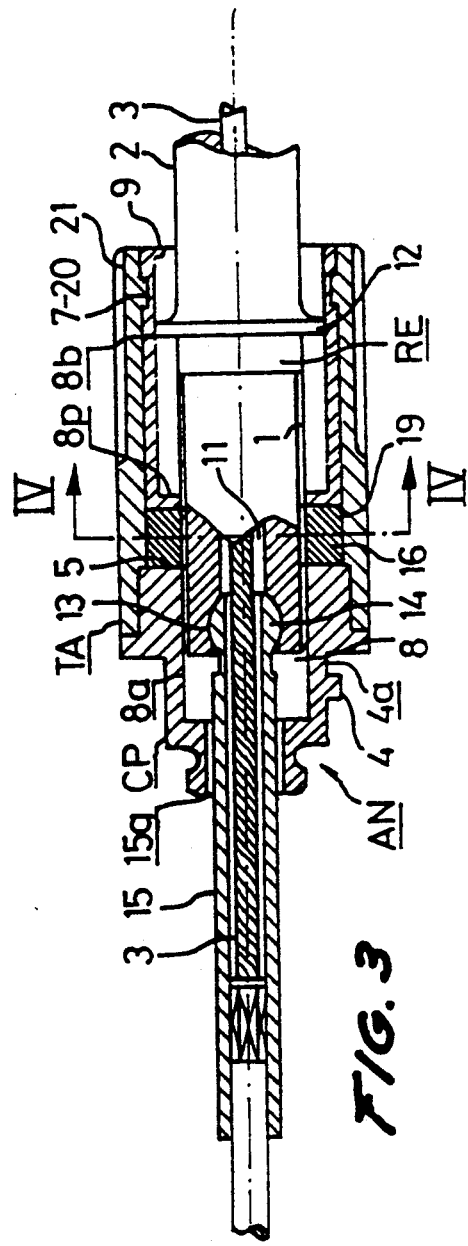

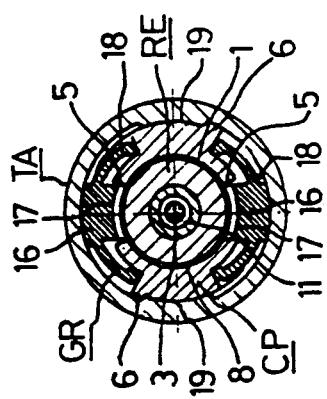
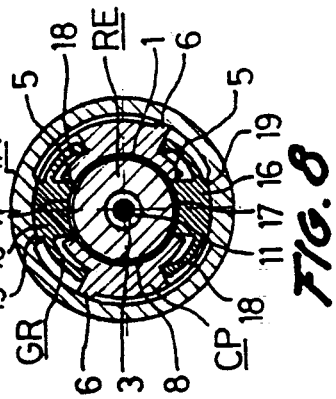
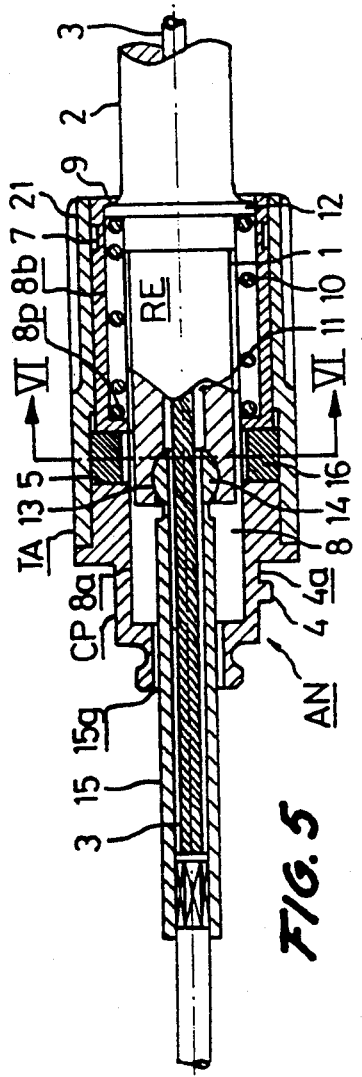
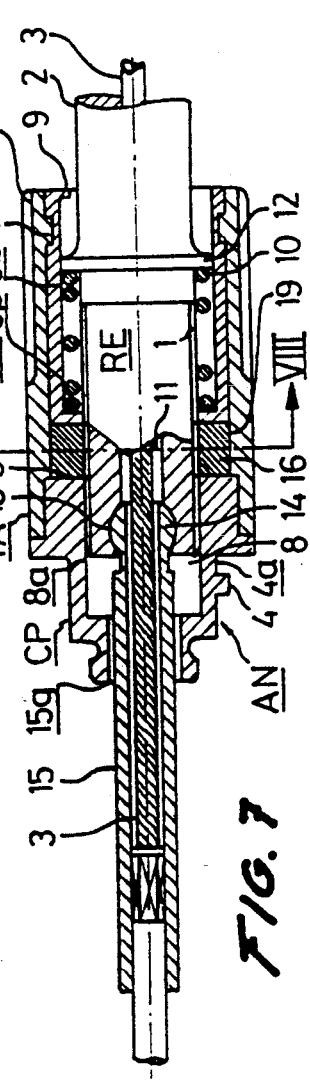
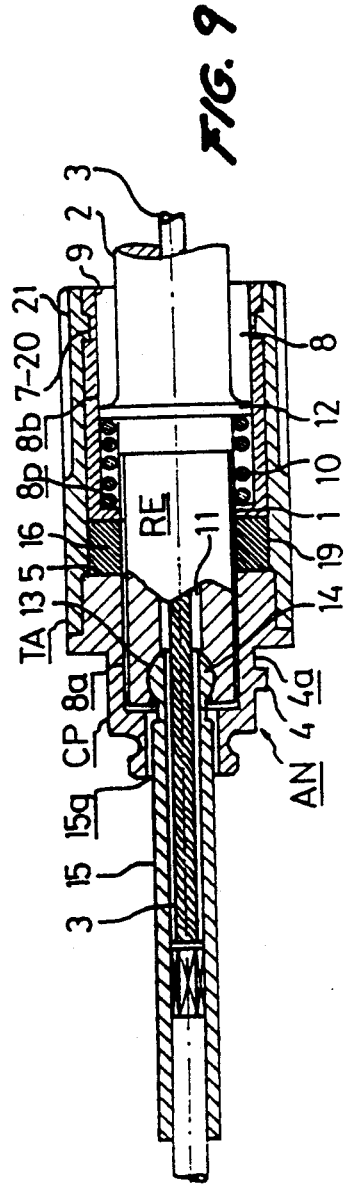

ADJUSTABLE CABLE SHEATH TERMINAL

BACKGROUND OF THE INVENTION

The present invention relates to an adjustable cable sheath terminal and, more particularly, to an adjustable cable sheath terminal for use in the automobile industry and in mechanical control devices. The adjustable sheathed cable described here particularly is useful for adjustment of the length of a sheathed cable.

Cables provided with protective sheaths or with sheaths adapted to any other function or purpose, are widely used in all kinds of mechanical applications where the transmission of forces or of movements between the source and receiver must be carried out with nonrigid links. Examples of such cables include, among others, the control cables used in the automobile industry which, among other functions, connect the clutch pedal to the corresponding clutch mechanism, interconnections of parts of the brake systems, or act as link between the gear shift lever and the gear box, as link between the hood opening control and the hood for the engine, and as links between the speedometer on the vehicle dashboard and the gear box.

A crucial factor for the optimum operation of a force transmission device using a cable of the above-mentioned type is the need to have the appropriate length of cable in each particular case. In view of the peculiar features of the installation of control cables in motor vehicles and the features corresponding to each type of cable with its specific connection and sheath terminals, the aforesaid condition makes it necessary to have recourse to more or less structurally and operationally complex devices which allow the length of the sheathed control cable to be adjusted at the points, depending on the structure of the vehicle itself or on assembly conditions.

The devices described in Spanish Patent P8803905, "Control Cable Tension Self-Adjusting Device", and in Spanish Patent P8901238, "Adjustable Connecting Device" are examples of the above described devices. In the former patent, Spanish Patent P8903905, the sheathed cable length is adjusted automatically by a spring which, initially compressed, is released, when the device is used; and in the latter patent, Spanish Patent P8901238, the adjustment of the sheathed control cable length is effected manually without using springs.

In both cases, i.e. in Spanish Patents P8803905 and P8901238, both the large number of component parts of the devices and their respective structures and designs have the drawback of a high production cost and limited operational flexibility which limits their possible uses.

SUMMARY OF THE INVENTION

To provide a new solution to the problems raised by the adjustment of the length of a cable having a protective sheath, and adjustable cable sheath terminal whose structure and operative design are novel is disclosed hereinafter.

According to the invention the adjustable cable sheath terminal comprises a cylindrical hollow main body provided with mechanical means for anchoring to a fixed point, an adjustable rod having an external screw thread and fixedly attached at one of its ends to the sheath of the cable whose length is to be adjusted so as to be slidable with the sheath over a sufficient distance inside the main body, and a rotatable lock nut with interior tightening means which in at least one rotational position engages radially outwardly spring-biased retaining fingers in radial throughgoing holes of the main body to firmly retain the adjusting rod in the desired position.

The main body, which is made from materials having mechanical properties adequate for the intended purpose, is provided with a sufficient number of radial throughgoing holes preferably disposed on a single plane perpendicular to the longitudinal axis of the main body, for adjustably housing the retaining fingers which, being of the same number as the radial holes, may retain the adjusting rod attached to the cable sheath in the desired position.

The outer surface of the main body is also formed with longitudinal projections for correctly positioning the lock nut relative to the adjusting rod retaining fingers and a sufficient number of appropriately dimensioned recesses for setting the position of the lock nut preventing it from inadvertently coming out of or changing its locked position.

An axial throughgoing hole in the main body of the terminal of the invention, and through which the adjusting rod attached to the cable sheath may slide over a sufficient distance, is provided with two portions of different diameters which may have a different length, in one of which the adjusting rod may snugly slide, while the other portion, which is of larger diameter, has a projecting lip limiting the maximum movement of the adjusting rod and preventing it from separating from the main body.

A particularly remarkable feature of the terminal of the invention is that the position of the adjusting rod, which is fixedly attached at one end thereof to the cable sheath inside the main body and which precisely caters for the adjustment of the sheathed cable, may be controlled manually or automatically by a spring which may be incorporated inside the main body.

The larger diameter portion of the axial throughgoing hole in the main body, through which the adjusting rod attached to the cable sheath may slide, is dimensioned such that it may conveniently house a spring which, under compression, may automatically adjust the sheathed cable length.

The spring is preferably disposed coaxially relative to the adjusting rod and presses at one end thereof against the flat surface of the shoulder of the axial throughgoing hole where the cross section changes and, at the other end thereof, against the adjusting rod. That flat surface of the shoulder is perpendicular to the longitudinal axis of the axial throughgoing hole.

The adjusting rod, which is provided with an external screw thread extending over a sufficient distance and is fixedly attached at one end thereof to the cable sheath, is provided with a longitudinal throughgoing hole through which a sheathless portion of cable inserted in the main body may conveniently slide. The end of the sheath has a preferably annular sheath projection which cooperates with the projecting lip inside the main body.

The retaining fingers for the adjusting rod are substantially parallelepiped shaped. Two opposing surfaces of these fingers are slightly curved, one of which is provided with a screw thread of the same pitch as the screw thread formed on the outer surface of the adjusting rod. The retaining fingers are also provided with ejector springs, e.g. corresponding resilient projections, which permanently urge the fingers radially outwardly, to establish the appropriate rest, i.e. released, position thereof, in the radial throughgoing holes formed in the main body.

The retaining fingers of the adjusting rod may be attached to a concentric open perimeter ring of resilient material, which acts as ejector springs, i.e. as a replacement for the resilient extensions.

The lock nut operating on the retaining fingers of the adjusting rod is provided in the interior thereof with longitudinal tightening projections for pressing, after an appropriate rotation of the lock nut, against the retaining fingers and overcoming the permanent action of the ejector springs. The number and position of the tightening projections are the same as the number and position of the radial throughgoing holes formed in the main body in which the retaining fingers are located. In the interior of the lock nut positioning projections are provided, the number and position of which are also the same as the number and position of the recesses formed in the outer surface of the main body for setting the position of the lock nut in the locking or retaining position of the adjusting rod.

The lock nut is also provided on the outer surface thereof with a knurled portion or a number of alternating recesses of appropriate dimensions which are for facilitating the operation of setting the length of the cable provided with protective or other sheath for the operation.

For ensuring correct guiding of the cable, the end of the adjusting rod opposite to the one fixedly attached to the cable sheath may optionally be provided with a tubular guide through which the sheathless portion of the cable slides.

BRIEF DESCRIPTION OF THE DRAWING

The objects, features and advantages of the present invention will now be illustrated in more detail by the following detailed description, reference being made to the accompanying drawing in which:

FIG. 1 is a longitudinal cross sectional view of an adjustable cable sheath terminal according to the invention showing the adjustment position in which the sheathed cable length is maximum, FIG. 2 is a transverse cross sectional view of the terminal of FIG. 1 taken along the section line II—II of FIG. 1, FIG. 3 is a longitudinal cross sectional view of the terminal of FIG. 1 showing an intermediate adjustment position of the sheathed cable length, FIG. 4 is a transverse cross sectional view of the terminal of FIG. 3 taken along the section line IV—IV of FIG. 3, FIG. 5 is a longitudinal cross sectional view of another adjustable cable sheath terminal according to the invention which has a spring for automatic adjustment showing the adjustment position in which the sheathed cable length is maximum, FIG. 6 is a transverse cross sectional view of the terminal of FIG. 5 taken along the section line VI—VI of FIG. 5, FIG. 7 is a longitudinal cross sectional view of the terminal of FIG. 6 showing an intermediate adjustment position of the sheathed cable length, FIG. 8 is a transverse cross sectional view of the terminal of FIG. 7 taken along the section line VIII—VIII of FIG. 7, FIG. 9 is a longitudinal cross sectional view of the terminal of FIG. 6 showing an adjustment position of the sheathed cable length in which the sheathed cable length is minimum.

DETAILED DESCRIPTION OF THE EMBODIMENT

Figure 10:
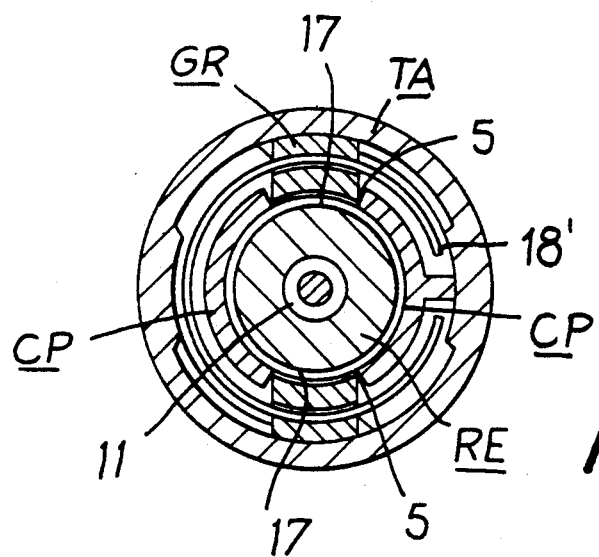
FIGS. 10 and 11 are transverse cross sectional views of another embodiment of an adjustable cable sheath terminal according to the invention corresponding to FIGS. 6 and 8 of the previous embodiment.

The adjustable cable sheath terminal of the invention shown in the exemplary embodiment in the drawing comprises a generally cylindrically shaped hollow main body CP provided with mechanical means AN for anchorage thereof to a fixed point, an adjusting rod RE having an external screw thread 1 and which, fixedly attached at one end thereof to the sheath 2 of the cable 3 whose length is to be adjusted, may slide over a sufficient distance in the interior of the main body CP and a lock nut TA, which engages the retaining fingers GR and which may retain the adjusting rod RE in the desired position.

In the present embodiment the mechanical means AN are constituted by the radial projection 4 forming one end of the main body CP. The radial projection 4 defines a U-shaped housing 4a of appropriate dimensions so that, in engagement with the means provided on the vehicle structure (which have not been shown in the drawing) forming the fixed point, the terminal of the invention may be fixedly attached to the fixed point on the vehicle, preventing any change of position relative to the intended operating position.

The main body CP is provided with two radial throughgoing holes 5 disposed, as shown in all the Figures of the attached sheets of drawings, on a single plane perpendicular to the longitudinal axis of the terminal of the invention. The radial throughgoing holes 5 are dimensioned so as to be able snugly to hold corresponding retaining fingers GR, whose purpose is to retain and fix the adjusting rod in the desired position, preventing inadvertent release, as shown in detail in FIGS. 2, 4, 6 and 8.

FIGS. 2, 4, 6 and 8 show how the outer surface of the main body CP is provided with two longitudinal projections 6 for positioning the lock nut TA correctly relative to the retaining fingers GR, while the cable length is being adjusted relative to the sheath 2.

The main body CP is also provided with two recesses 7, shown in FIGS. 1, 3, 5, 7 and 9 which, suitably dimensioned, have the purpose of providing means for fixing the lock nut TA in the tightened or retained position of the adjusting rod RE, shown in FIGS. 3, 7 and 9, thereby preventing the terminal of the invention from coming out of or changing its position, owning to the operative conditions to which it is subjected, when the vehicle is operating.

The main body CP is provided with the longitudinal throughgoing hole 8 through which the adjusting rod RE attached to the sheath 2 of the cable 3 may slide over a sufficient distance. The axial throughgoing hole 8 has a first portion 8a in which the adjusting rod RE may snugly slide, while the remaining portion 8b, which is of larger diameter, contains the projecting lip 9, the purpose of which is to limit the maximum movement of the adjusting rod RE, thereby preventing it from coming out of the main body CP, as shown in detail in FIGS. 1 and 5.

The position of the adjusting rod RE, which is attached to the sheath 2 of the cable 3, in the interior of the main body CP, and which provides for the adjustment of the sheathed cable 2-3, may be manually controlled as shown in FIGS. 1 and 3, or automatically by action of a spring 10 housed in the main body CP, as shown in FIGS. 5, 7 and 9.

The larger diameter portion 8b of the longitudinal throughgoing hole 8 of the main body CP may be dimensioned in such a way as to be able to house the spring 10 which, under compression, expands and automatically adjusts the length of the cable 3 provided with the sheath 2.

The spring 10 is preferably coaxially disposed relative to the adjusting rod RE and presses, at one end thereof, against the flat surface 8p of the shoulder in the axial throughgoing hole 8 at which the transverse cross section changes. As shown in FIGS. 1, 3, 5, 7 and 9, the flat surface 8p is perpendicular to the longitudinal axis of the axial throughgoing hole 8. At the other end thereof the spring 10 presses against the adjusting rod RE.

The adjusting rod RE is provided with a longitudinal throughgoing hole 11 through which the cable 3 may suitably slide, as shown in all of the drawing figures. The end of the adjusting rod RE fixedly attached to the sheath 2 of the cable 3 is formed by the preferably annular rim 12 which cooperates with the lip 9 disposed on the larger diameter section 8b of the axial throughgoing hole 8 of the main body CP.

In this embodiment, with a view to guiding the cable 3 correctly in the longitudinal movements thereof, the end of the adjusting rod RE opposite to the end attached to the sheath 2 of the cable 3 is provided with a seat 13 acting as housing and retaining means for the end 14 of the tubular guide 15, as shown in detail in FIGS. 1, 3, 5, 7 and 9. The cable 3 may slide suitably therethrough. The tubular guide 15 is, in turn, suitably guided by the throughgoing hole 15g through which it may slide snugly.

The retaining fingers GR retaining the adjusting rod RE in the desired position are each formed by an essentially parallelepiped shaped body 16, two opposite surfaces of which are slightly curved. One of the surfaces is provided with a screw thread 17 of the same pitch as the external screw thread 1 of the adjusting rod RE. The retaining fingers GR are also provided with ejector springs which in the present embodiment are formed by corresponding resilient extensions 18 permanently urging the fingers GR radially outwardly into the appropriate rest, i.e. released position thereof, in the radial throughgoing openings 5 formed in the main body CP. FIGS. 2, 4, 6 and 8 show the retaining fingers GR of this embodiment in detail.

The number of retaining fingers GR may obviously be different from the number contemplated in this embodiment, depending on the needs raised in each particular application.

Figure 11:
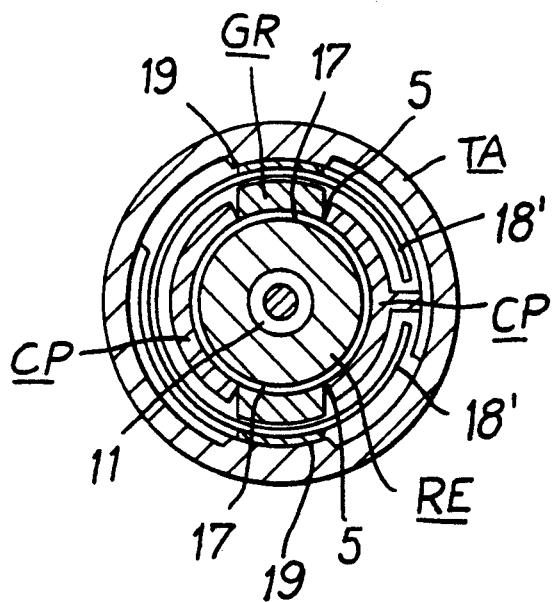

Instead of the resilient extensions 18, in another embodiment of the invention shown in FIGS. 10 and 11 (corresponding to FIGS. 6 and 8 and 2 and 4) the retaining fingers GR may be attached to a concentric ring 18' of resilient material and having an open perimeter, acting in place of the ejector springs. In other respects this embodiment is the same as the other embodiments described in this section and the same reference numbers are used for the same parts.

The lock nut TA operating on the retaining fingers GR is provided in the interior thereof with two longitudinal tightening projections 19 for pressing, after an appropriate rotation of the lock nut TA, against the retaining fingers GR overcoming the permanent action of the ejector springs which, in this embodiment, are formed by the resilient extensions, to which end the number and position thereof are the same as the number and position of the radial throughgoing holes 5 formed in the main body CP in which the retaining fingers GR are housed. The interior of the lock nut TA is also provided with the two positioning projections 20, the number and position of which are also the same as the number and position of the recesses 7 of the main body CP and with they cooperate as shown in detail in FIGS. 3, 7 and 9.

The lock nut TA of this embodiment, as shown in FIGS. 1, 3, 5, 7 and 9, is also provided with a number of alternating longitudinal recesses 21 suitably dimensioned to facilitate the adjustment of the length of the cable 3 by the operator. To this end the series of longitudinal recesses 21 may be replaced by a knurling or even by appropriately dimensioned projecting members distributed over the outer surface of the lock nut TA.

FIGS. 1 and 3 show the terminal of the invention in which the length of cable 3 provided with the sheath 2 is adjusted manually. In FIG. 1, the position of the lock nut TA, shown in FIG. 2 allows the adjusting rod RE to slide inside the main body CP to the extent required for adjusting the length of the sheathed cable 2-3. FIG. 3 shows how, once the appropriate length of the sheathed cable 2-3 has been determined by the appropriate sliding of the adjusting rod RE, the position of the lock nut TA, shown in FIG. 4 and attained by rotation thereof, causes the screw thread of the retaining fingers GR and the external screw thread 1 of the adjusting rod RE to be firmly locked together, so that the longitudinal sliding of the adjusting rod RE is prevented. FIG. 3 shows how the recesses 7 and the positioning projections 20, disposed on the main body CP and the lock nut TA, respectively, become mutually engaged to prevent the lock nut TA from inadvertently coming out of or changing the locking position described.

FIGS. 5, 7 and 9 show the terminal of the invention in which the length of the sheathed cable 2-3 is adjusted automatically by action of the spring 10 housed inside the main body CP. FIG. 9 shows the state in which the terminal of the invention is supplied for use. Under these conditions, the spring 10 is compressed owing to the position occupied by the adjusting rod RE and the length of the sheathed cable 2-3 is at its shortest. The position of the adjusting rod RE is firmly fixed, since the screw threads 1 and 17 on the adjusting rod RE and the retaining fingers GR, respectively, are locked together by action of the longitudinal tightening projections 19 formed on the inside of the lock nut TA, since the latter is in the position shown in FIG. 9. In this position of the lock nut TA, the recesses 7 and positioning projections 20, disposed on the main body CP and on the lock nut TA, respectively, are in mutual engagement and prevent the lock nut TA from coming out of or changing the locking position described.

Once the terminal of the invention has been firmly attached to a fixed point by way of the mechanical means AN formed on the main body CP and the ends of the cable 3 and sheath 2 are appropriately attached, rotation of the lock nut TA causes release of the adjusting rod RE which is urged by the spring 10 to slide longitudinally to the point in which the length of the sheathed cable 2-3 is appropriate for the particular application. Once the length of the sheathed cable 2-3 has been set automatically, the position of the adjusting rod RE is firmly fixed by a further rotation of the lock nut TA which causes the longitudinal tightening projections 19 thereof to engage the retaining fingers GR, whereby the screw threads 1 and 17 of the adjusting rod RE and the retaining fingers GR, respectively, will be locked together, thereby preventing the position of the adjusting rod RE and, consequently, the adjusted length of the sheathed cable 2-3 from varying. The mutual engagement of the recesses 7 an the positioning projections 20, disposed on the main body CP and on the lock nut TA, in turn prevents the lock nut TA from coming out of or changing the locked position described.

FIG. 5 shows the position occupied by the adjustment rod RE urged by the spring 10, when the latter is released and in which the length of the sheathed cable 2-3 is at its longest. Fixation in this position is carried out as described above.

The embodiment described above in no way limits the concept of the invention as expressed in the appended claims and the details of that embodiment may be modified in any way not affecting the essential structure thereof which is necessary to adapt it to the needs of each particular application.

It will be understood that each of the elements described above, or two or more together, may also find a useful application in other types of structures differing from the types described above.

While the invention has been illustrated and embodied in an adjustable cable sheath terminal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. An adjustable cable sheath terminal for a sheathed cable, said cable sheath terminal comprising a substantially cylindrical hollow main body (CP) having an outer surface and a plurality of radial throughgoing openings (5), being provided with an axial throughgoing hole (8) and being provided with mechanical means (AN) for anchoring the hollow main body to a fixed point; an adjusting rod (RE) having two ends and an external screw thread (1), said adjusting rod (RE) being fixed at one of the two ends thereof to a sheath of a sheathed cable and being formed to be slidable over a distance with said sheath in the hollow main body so that the sheathed cable is adjustable in length; a plurality of retaining fingers (GR) with spring-biasing means (18), each of said retaining fingers (GR) being held and movable radially in a different one of said radial throughgoing openings (5) and having means for engagement (17) with said external screw thread (1) of said adjusting rod (RE) so that, when the retaining fingers are engaged with the adjusting rod, the adjusting rod cannot rotate relative to said retaining fingers, said retaining fingers being urged outwardly by said spring-biasing means for disengagement of said means for engagement (17) from said external screw thread (1) so that said adjusting rod (RE) is slidable with said sheath in said hollow main body (CP); and a rotatable lock nut (TA) surrounding said hollow main body (CP) and having tightening means (19) for engagement in at least one rotational position of the lock nut with the retaining fingers (GR) to overcome the spring-biasing means urging the retaining fingers radially outwardly and to engage the means for engagement of the retaining fingers (GR) with the external screw thread (1) to hold the adjusting rod fixed in position in the hollow main body, and so that in at least one other rotational position of the lock nut the tightening means disengage from retaining fingers (GR) so that the retaining fingers (GR) move radially outwards and the means for engagement of the retaining fingers disengage from the external screw thread (1) so that the adjusting rod (RE) is slidable with the sheath in the hollow main body (CP).

2. An adjustable cable sheath terminal according to claim 1, wherein said means for engagement of the retaining fingers comprises an internal thread of the retaining fingers.

3. An adjustable cable sheath terminal according to claim 2, wherein each of the retaining fingers (GR) is substantially parallelepiped shaped and provided with two curved opposing surfaces, an interior one of said curved surfaces being provided with the internal thread and the spring-biasing means comprises a plurality of resilient projections (18) of the retaining fingers acting like ejector springs, said resilient projections (18) permanently urging said retaining fingers (GR) radially outwardly toward a released position in the radial throughgoing holes (5) in the hollow main body (CP).

4. An adjustable cable sheath terminal according to claim 3, wherein the hollow main body (CP) is provided with a plurality of recesses (7) in which said lock nut (TA) is engagable for setting the lock nut (TA) in at least one of the rotational positions and the lock nut (TA) is provided interiorly with a plurality of positioning projections (20) corresponding in number and position to the number and position of the recess in the outer surface of the hollow main body (CP).

5. An adjustable cable sheath terminal according to claim 2, further comprising an open ring of resilient material coaxially positioned relative to said main hollow body and engaging said retaining fingers, said open ring of resilient material acting as said spring-biasing means.

6. An adjustable cable sheath terminal according to claim 1, wherein the tightening means (19) comprises a plurality of longitudinal tightening projections provided interiorly in the lock nut (TA) and corresponding in number and position with the number and position of the radial throughgoing holes (5) in the hollow main body (CP), said tightening projections engaging, in the at least one rotational position, the retaining fingers (GR) with the adjusting rod (RE) to hold the adjusting rod fixed in the main body.

7. An adjustable cable sheath terminal according to claim 1, wherein the hollow main body (CP) is provided with a plurality of longitudinal projections (6) extending from the outer surface for engaging and positioning the lock nut (TA) in the at least one other rotational position in which the retaining fingers are disengaged from the adjusting rod.

8. An adjustable cable sheath terminal according to claim 1, wherein the axial throughgoing hole (8) has two portions (8a, 8b) of two different diameters, each of said portions (8a, 8b) having a different length, and in one (8a) of the two portions (8a, 8b) having a smaller of the two different diameters the adjusting rod (RE) is snugly slidable, while another (8b) of the two portions (8a, 8b) having a larger of the two diameters is provided with interiorly projecting lips (9) limiting displacement of the adjusting rod (RE) and preventing the adjusting rod (RE) from leaving the hollow main body (CP).

9. An adjustable cable sheath terminal according to claim 8, further comprising a spring (10) disposed coaxially relative to the adjusting rod (RE) and having two ends, one of the spring ends being engaged with a flat surface (8p) provided on a shoulder of the hollow main body between said two portions (8a, 8b) and another of the spring ends being held on the adjusting rod (RE), wherein the portion (8b) of the axial throughgoing hole (8) of the larger diameter is dimensioned so that the spring (10) can be held therein under compression.

10. An adjustable cable sheath terminal according to claim 9, wherein the sheath is provided with an annular sheath projection (12) cooperating with the lips provided on the main body (C) to retain the adjusting rod in the main body and the other end of the spring presses on the annular sheath projection (12) of the sheath.

11. An adjustable cable sheath terminal according to claim 1, wherein the lock nut (TA) is provided with a knurled portion on an exterior surface thereof for facilitating rotation of said lock nut.

12. An adjustable cable sheath terminal according to claim 1, wherein the lock nut (TA) is provided with a plurality of alternating recesses (21) on an exterior surface thereof, said recesses being dimensioned to facilitate rotation of said lock nut.

13. An adjustable cable sheath terminal according to claim 1, further comprising a tubular guide (15) connected to the end of the adjusting rod remote from the end fixed to the sheath (2), a sheathless portion of the sheathed cable sliding through said tubular guide (15).

14. An adjustable cable sheath terminal for a sheathed cable, said cable sheath terminal comprising a substantially cylindrical hollow main body (CP) having an outer surface and a plurality of radial throughgoing openings (5) through the main body (CP), being provided with an axial throughgoing hole (8) for a sheathless portion of a sheathed cable and being provided with mechanical means (AN) for anchoring the hollow main body to a fixed point; an adjusting rod (RE) having two ends and having an external screw thread (1), said adjusting rod (RE) being fixed at one of the two ends thereof to a sheath of the sheathed cable and being formed to be slidable over a distance with said sheath in the hollow main body (CP) so that the sheathed cable is adjustable in length; a plurality of retaining fingers (GR) with resilient projections acting as ejector springs, each of said retaining fingers (GR) being held and radially moveable in a different one of said radial throughgoing openings (5) and having an internal thread for engagement with said external screw thread (1) of said adjusting rod (RE) so that, when the retaining fingers are engaged with the adjusting rod (RE), the adjusting rod cannot rotate relative to the retaining fingers, the retaining fingers being urged outwardly by the resilient projections for disengagement of the internal threads from the external screw thread (1) so that, when the internal threads are disengaged from the external screw thread (1), the adjusting rod (RE) is slidable with the sheath in the hollow main body (CP); and a rotatable lock nut (TA) surrounding said hollow main body (CP) and having a plurality of interior longitudinal tightening projections positioned and dimensioned for engagement in at least one rotational position of the lock nut with the retaining fingers (GR) to overcome the resilient projections urging the retaining fingers radially outwardly and to engage the internal threads of the retaining fingers (GR) with the external screw thread (1) of the adjusting rod to hold the adjusting rod fixed in position in the hollow main body and so that in at least one other rotational position of the lock nut the tightening projections disengage from retaining fingers (GR) so that the retaining fingers (GR) move radially outwards and the internal threads disengage from the external screw thread (1) so that the adjusting rod (RE) is slidable with the sheath in the hollow main body (CP).

15. An adjustable cable sheath terminal according to claim 14, wherein the axial throughgoing hole (8) has two portions (8a, 8b) of two different diameters, each of said portions (8a, 8b) having a different length, and in one (8a) of the two portions (8a, 8b) having a smaller of the two different diameters the adjusting rod (RE) is snugly slidable, while another (8b) of the two portions (8a, 8b) having a larger of the two diameters is provided with interiorly projecting lips (9) limiting displacement of the adjusting rod (RE) and preventing the adjusting rod (RE) from leaving the hollow main body (CP).

16. An adjustable cable sheath terminal according to claim 15, further comprising a spring (10) disposed coaxially relative to the adjusting rod (RE) and having two ends, one of the spring ends being engaged with a flat surface (8p) provided on a shoulder of the hollow main body between said two portions (8a, 8b) and another of the spring ends being held on the adjusting rod (RE), wherein the portion (8b) of the axial throughgoing hole (8) of the larger diameter is dimensioned so that the spring (10) is held therein under compression.

17. An adjustable cable sheath terminal according to claim 16, wherein the sheath is provided with an annular sheath projection (12) cooperating with the lips provided on the hollow main body (CP) to retain the adjusting rod (RE) in the main body and the other end of the spring presses on the annular sheath projection (12) of the sheath.

* * * * *